United States Patent
Takahashi

[19]
[11] Patent Number: 6,101,053
[45] Date of Patent: Aug. 8, 2000

[54] WRITE CONDITION SETTING METHOD AND DISK UNIT

[75] Inventor: Tsuyoshi Takahashi, Kawasaki, Japan

[73] Assignee: Fujitsu Limited, Kawasaki, Japan

[21] Appl. No.: 09/084,817

[22] Filed: May 26, 1998

[30] Foreign Application Priority Data

| | | | |
|---|---|---|---|
| May 29, 1997 | [JP] | Japan | 9-140442 |
| May 21, 1998 | [JP] | Japan | 10-139799 |

[51] Int. Cl.⁷ ..................................................... G11B 5/09
[52] U.S. Cl. ............................................. 360/46; 360/53
[58] Field of Search .................. 360/46, 53, 31; 369/59

[56] References Cited

U.S. PATENT DOCUMENTS 5,600,500   2/1997   Madsen et al. .......................... 360/46

FOREIGN PATENT DOCUMENTS

| | | |
|---|---|---|
| 58-159216 | 9/1983 | Japan . |
| 60-70502 | 4/1985 | Japan . |
| 60-74102 | 4/1985 | Japan . |
| 60-98565 | 6/1985 | Japan . |
| 60-143404 | 7/1985 | Japan . |
| 61-156574 | 7/1986 | Japan . |
| 2-304702 | 12/1990 | Japan . |
| 7-14107 | 1/1995 | Japan . |
| 8-293165 | 11/1996 | Japan . |
| 8-293174 | 11/1996 | Japan . |
| 9-122593 | 5/1997 | Japan . |

*Primary Examiner*—W. Chris Kim
*Attorney, Agent, or Firm*—Greer, Burns & Crain, Ltd.

[57] ABSTRACT

A write condition setting method includes a measuring step for measuring at least one of a track per inch margin, an offset margin and an on-track accuracy margin with respect to a head for each of a plurality of temperatures prior to writing data on a track of a disk, and a setting step for variably setting at least one of a write current applied to the head and an off-track slice as a write condition for each of the plurality of temperatures based on a parameter which is dependent upon temperature so that the at least one of the track per inch margin, the offset margin and the on-track accuracy margin becomes a maximum.

21 Claims, 11 Drawing Sheets

FIG. 3

| HEAD / ZONE | 0 | 1 | 2 | ... | n |
|---|---|---|---|---|---|
| 1 | $I_{10}$ | $I_{11}$ | $I_{12}$ | ... | $I_{1n}$ |
| 2 | $I_{20}$ | $I_{21}$ | $I_{22}$ | ... | $I_{2n}$ |
| 3 | $I_{30}$ | $I_{31}$ | $I_{32}$ | ... | $I_{3n}$ |
| 4 | $I_{40}$ | $I_{41}$ | $I_{42}$ | ... | $I_{4n}$ |
| 5 | $I_{50}$ | $I_{51}$ | $I_{52}$ | ... | $I_{5n}$ |
| . | . | . | . | ... | . |
| m | $I_{m0}$ | $I_{m1}$ | $I_{m2}$ | ... | $I_{mn}$ |

FIG. 5

| HEAD ZONE | 0 | 1 | 2 | ... | n |
|---|---|---|---|---|---|
| 1 | $O_{10}$ | $O_{11}$ | $O_{12}$ | ... | $O_{1n}$ |
| 2 | $O_{20}$ | $O_{21}$ | $O_{22}$ | ... | $O_{2n}$ |
| 3 | $O_{30}$ | $O_{31}$ | $O_{32}$ | ... | $O_{3n}$ |
| 4 | $O_{40}$ | $O_{41}$ | $O_{42}$ | ... | $O_{4n}$ |
| 5 | $O_{50}$ | $O_{51}$ | $O_{52}$ | ... | $O_{5n}$ |
| . | . | . | . | ... | . |
| m | $O_{m0}$ | $O_{m1}$ | $O_{m2}$ | ... | $O_{mn}$ |

WRITE CONDITION SETTING METHOD AND DISK UNIT

BACKGROUND OF THE INVENTION

The present invention generally relates to write condition setting methods and disk units, and more particularly to a write condition setting method which sets at least one of a write current that is applied to a head when writing data on a magnetic disk and an off-track slice as a write condition, and to a disk unit which employs such a write condition setting method.

Recently, due to improvements made in the operating speed and performance of computer systems, here are more opportunities to process an extremely large amount of data. For this reason, there are demands to improve the operating speed, storage capacity and performance of magnetic disk units which are often used as auxiliary storage units.

In order to improve the storage capacity of the magnetic disk unit, there is a proposed method which increases the Track Per Inch (TPI) or the Bit Per Inch (BPI), so as to improve the Bit Per Square Inch (BPSI). On the other hand, there is a proposed method which uses a magneto-resistive (MR) head made up of a magneto-resistive element as a read head.

As the TPI becomes large, the interval or pitch of the tracks on which the data are written has becomes extremely small, and it has become necessary to minimize magnetic interference among the adjacent tracks.

When determining a write current which is applied to the head when writing data on the magnetic disk in the conventional magnetic disk unit, the write current is generally determined based on an overwrite characteristic and a saturation characteristic of a head output level. Generally, the magnetic disk unit does not erase the previously written data before writing the new data, and overwrites the new data over the previously written data. For this reason, a residual component of the previously written data remains even after the new data is written over the previously written data by the overwrite. The overwrite characteristic indicates the extent to which this residual component of the previously written data remains after the overwrite. On the other hand, the saturation characteristic of the head output level indicates a maximum level at which the output level of the head saturates by taking the write current as the parameter.

After the write current is determined, the write current is fixedly set with respect to the magnetic disk unit.

When the TPI is large, the magnetic interference with respect to the adjacent tracks becomes more notable when writing the data, due to an error in the positioning accuracy when positioning the head to a predetermined track by moving an actuator mounted with the head, a run out (deviation of the positioning) caused by an eccentricity component of a spindle motor which rotates the disk, an inconsistency of the width of the written track (spreading of the track that is written or, write spread) depending on the accuracy of a code width of the head, and the like. For this reason, a read margin at the time when the data are read from the disk is decreasing.

Conventionally, the write current applied to the head is fixed regardless of the magnetic disk unit. However, the error in the positioning accuracy, the run out, the inconsistency of the written track and the like are slightly different among the individual magnetic disk units due to the slight inconsistencies among the parts used. As a result, there was a problem in that the write current which is fixedly set with respect to the magnetic disk unit may not necessarily be an optimum write current for the magnetic disk unit.

In addition, the parameters such as the error in the positioning accuracy, the run out, and the inconsistency of the written track vary depending on the environment in which the magnetic disk unit is used, and the parameters are particularly affected by the temperature. However, even though the parameters vary depending on the environment, and particularly the temperature, no consideration is given as to the parameters which are dependent upon the temperature when setting the write current in the conventional magnetic disk unit, and there was a problem in that an optimum write current cannot be set with respect to the environment in which the magnetic disk unit is used.

On the other hand, when an off-track slice which indicates a limit value of a positional error quantity of the head with respect to a track which is to be scanned by the head is fixedly set with respect to the magnetic disk unit, an excessive or an insufficient check may be made with respect to the TPI margin, depending on the inconsistencies of the above described error in the positioning accuracy, the run out and the write spread. For this reason, there was a problem in that the TPI margin which is actually used becomes inconsistent depending on the head or the track position.

SUMMARY OF THE INVENTION

Accordingly, it is a general object of the present invention to provide a novel and useful write condition setting method and disk unit, in which the problems described above are eliminated.

Another and more specific object of the present invention is to provide a write condition setting method and a disk unit which can set at least one of an optimum write current and an optimum off-track slice as a write condition with respect to each individual disk unit by taking into consideration parameters. which are dependent upon the environment such as the temperature.

Still another object of the present invention is to provide a write condition setting method comprising the steps of (a) measuring at least one of a track per inch margin, an offset margin and an on-track accuracy margin with respect to a head for each of a plurality of temperatures prior to writing data on a track of a disk, and (b) variably setting at least one of a write current applied to the head and an off-track slice as a write condition for each of the plurality of temperatures based on a parameter which is dependent upon temperature so that the one of the track per inch margin, the offset margin and the on-track accuracy margin becomes a maximum. According to the write condition setting method of the present invention, it is possible to set at least one of an optimum write current and an optimum off-track slice as the write condition with respect to each individual disk unit by taking into consideration the parameter which is dependent upon the temperature. In addition, it is possible to cope with changes in the characteristics of parts within the disk unit that occur with time. Further, it is possible to prevent a permanent error (unrecoverable error) such as data destruction by generating an alarm when a limit value of a positional error quantity of the head with respect to a track to be scanned exceeds a predetermined value. Hence, it is possible to prevent interference to and from the adjacent track at the time of the write operation.

A further object of the present invention is to provide a disk unit comprising a head writing data to and reading data from a track of a disk, measuring means for measuring at least one of a track per inch margin, an offset margin and an on-track accuracy margin with respect to the head for each of a plurality of temperatures prior to writing data on a track of a disk by the head, and setting means for variably setting at least one of a write current applied to the head and an off-track slice as a write condition for each of the plurality of temperatures based on a parameter which is dependent upon temperature so that the one of the track per inch margin, the offset margin and the on-track accuracy margin becomes a maximum. According to the disk unit of the present invention, it is possible to set at least one of an optimum write current and an optimum off-track slice as the write condition with respect to each individual disk unit by taking into consideration the parameter which is dependent upon the temperature. In addition, it is possible to cope with changes in the characteristics of parts within the disk unit that occur with time. Further, it is possible to prevent a permanent error (unrecoverable error) such as data destruction by generating an alarm when a limit value of a positional error quantity of the head with respect to a track to be scanned exceeds a predetermined value. Hence, it is possible to prevent interference to and from the adjacent track at the time of the write operation.

Other objects and further features of the present invention will be apparent from the following detailed description when read in conjunction with the accompanying drawings.

BRIEF DESCRIPTION OF THE DRAWINGS

FIG.3 is a diagram showing an embodiment of a table of write current values stored in a memory part;

FIG.5 is a diagram showing an embodiment of a table of off-track slice values stored in the memory part;

DETAILED DESCRIPTION OF THE PREFERRED EMBODIMENTS

Figure 1:
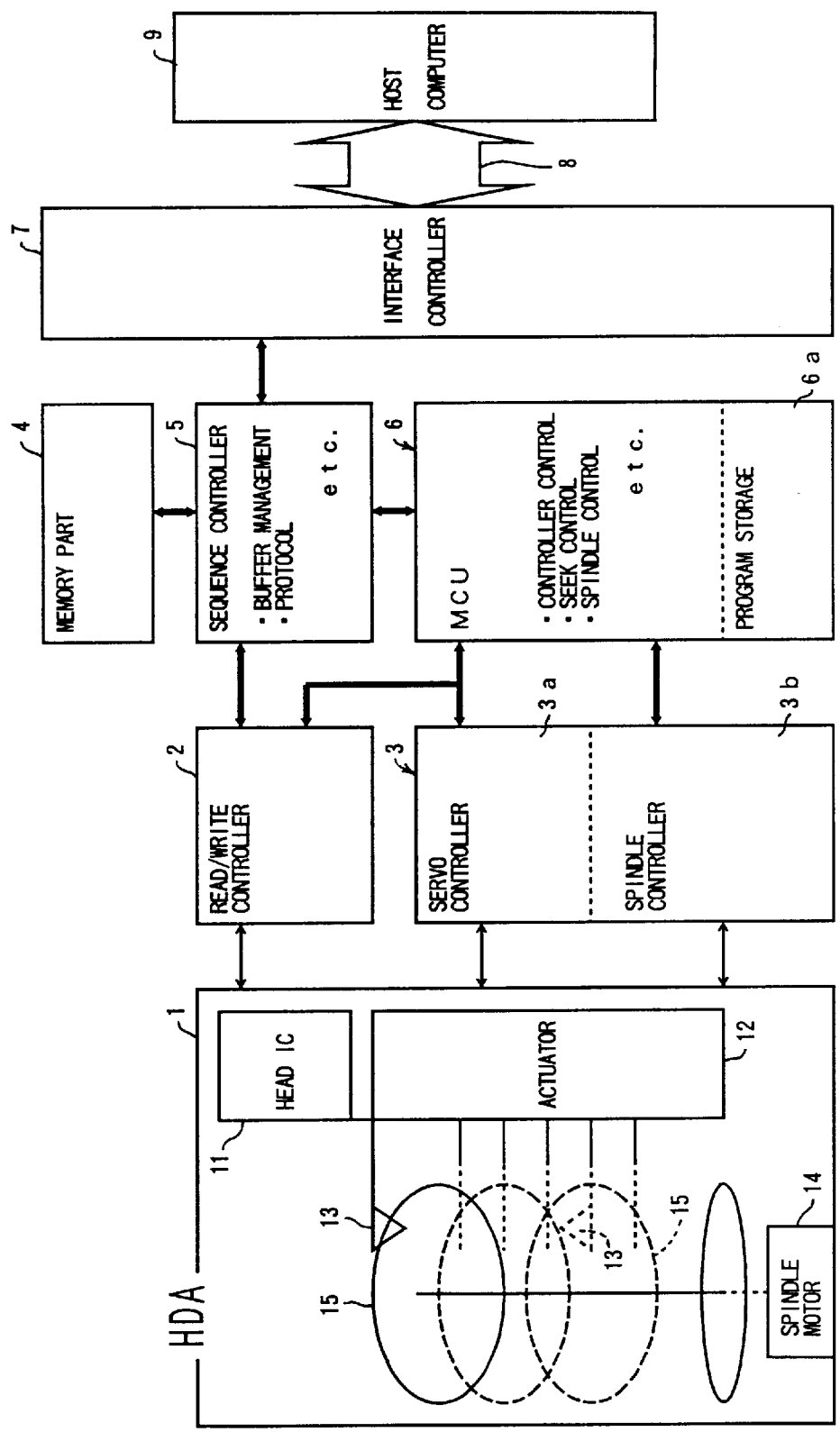
FIG.1 is a system block diagram showing the general construction of an embodiment of a disk unit according to the present invention.

FIG.1 is a system block diagram showing the general construction of an embodiment of a disk unit according to the present invention. This embodiment of the disk unit employs an embodiment of a write condition setting method according to the present invention. In addition, in this embodiment of the disk unit, the present invention is applied to a magnetic disk unit.

A magnetic disk unit generally includes a head disk assembly (HDA) 1, a read/write controller 2, a control unit 3, a memory part 4, a sequence controller 5, a microcontroller unit (MCU) 6, and an interface controller 7 which are connected as shown in FIG.1. The interface controller 7 is coupled to a host computer 9 via an interface 8.

The HDA 1 has a known construction including a head integrated circuit (IC) 11, an actuator 12, a plurality of heads 13, a spindle motor 14, and a plurality of magnetic disks 15. The head IC 11 controls the write to the disks 15 by the heads 13, and controls the read from the disks 15 by the heads 13. The actuator 12 controls the positioning of each of the heads 13 with respect to each of the disks 15. The spindle motor 14 drives a spindle which is mounted with each of the disks 15 and rotates the disks 15.

The read/write controller 2 controls the modulation and write operation of the RDA 1 with respect to the data to be written on the disk 15, and controls the demodulation and read operation of the HDA 1 with respect to the data read from the disk 15. The control unit 3 includes a servo controller 3a which controls a seek operation and the like, and a spindle controller 3b which controls the spindle motor 14. The memory part 4 is used as a buffer memory and stores various data.

The sequence controller 5 carries out buffer management, protocol management and the like, and controls the transmission and reception related to the data transfer between the magnetic disk unit and the host computer 9. The MCU 6 includes a program storage 6a, and controls the operation of the entire magnetic disk unit by controlling the controllers 2 and 5 and the control unit 3. The interface controller 7 is coupled to the host computer 9 via the interface 8, and controls the interface 8 between the magnetic disk unit and the host computer 9. The sequence controller 5 and the interface controller 7 form a hard disk controller (HDC) which will be described later. The host computer 9 inputs to the magnetic disk unit the data to be written on the disk 15 within the HDA 1, and process the data read from the disk 15.

Figure 2:
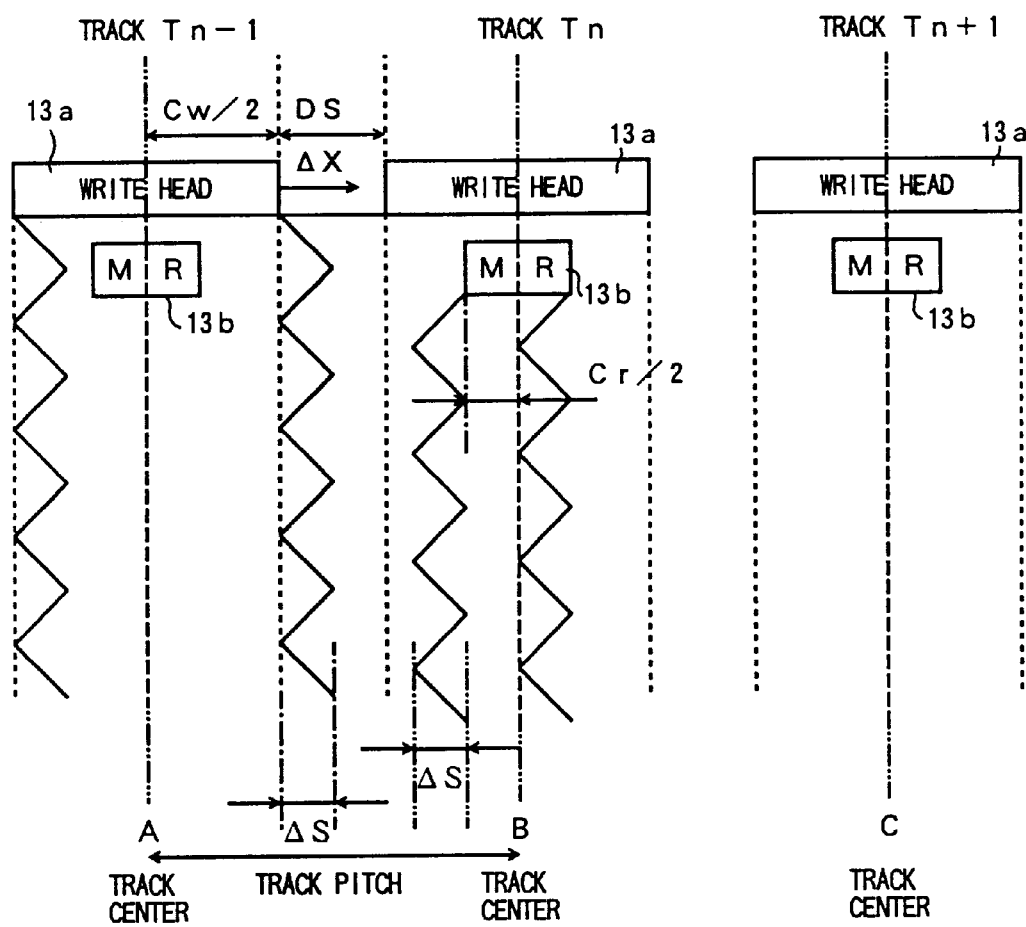
FIG.2 is a diagram for explaining a method of measuring a TPI margin.

FIG.2 is a diagram for explaining method of measuring a TPI margin. The TPI margin indicates a limit of a track offset from an adjacent track that enables a read head to be on-track with respect to a predetermined track (or cylinder) and to read data from the predetermined track, even if a portion of the predetermined track written with the data is written with other data when writing the adjacent track on one side of the predetermined track or when writing the adjacent tracks on both sides of the predetermined track.

In FIG.2, it is assumed for the sake of convenience that tracks $T_{n-1}$, $T_n$ and $T_{n+1}$ are formed on one disk 15 within the HDA 1, and that the head 13 is made up of an inductive head (write head) 13a and a MR head (read head) 13b. A write core width Cw of the write head 13a is set larger than a read core width Cr of the read head 13b by taking into consideration a read loss caused by a yaw angle. In FIG.2, A, B and C respectively indicate centers of the tracks $T_{n-1}$, $T_n$ and $T_{n+1}$ (hereinafter referred to as track centers), DS indicates an unwritten space (dead space), ΔS indicates a track following accuracy error (on-track accuracy), and ΔX indicates a offset quantity from the adjacent track.

The on-track accuracy includes components of a Repeatable Run Out (RRO) synchronized to the rotation of the spindle motor 14, a Non-Repeatable Run Out (NRRO) non-synchronized to the rotation of the spindle motor 14, a core deviation correction error, a servo following (or tracking) error and the like. A center of the write core width Cw and a center of the read core width Cr do not necessarily match due to inconsistencies introduced during the production process of the head 13. For this reason, when reading the track which is written with data, the tracking is generally corrected so that the center of the read core width Cr at the time of the read matches the center of the write core width Wr at the time of the write, and the above core deviation correction error is an error component which is generated when making this tracking correction. In addition, the servo following error is a tracking error component which is generated by Barkhausen noise or an output signal waveform of the MR head 13b which is vertically asymmetrical about the horizontal axis. In this specification, "a waveform which is vertically asymmetrical about the horizontal axis" is intended to mean that a waveform has a first portion on a positive polarity side of the vertical axis and a second portion on a negative polarity side of the vertical axis, and that the waveforms of the first and second portions are asymmetrical about the horizontal axis when the time base of at least one of the first and second portions is shifted to see if the first portion is a-mirror image of the second portion with respect to the horizontal axis.

The offset quantity $\Delta X$ with respect to the track $T_n$ from the adjacent track $T_{n-1}$ is obtained in the following manner, and this offset quantity $\Delta X$ becomes the TPI margin. In other words, an offset quantity OSQ for the case where the write is made with an offset from the track center A of the adjacent track $T_{n-1}$ can be described by OSQ=$\Delta X+\Delta S$, and an error quantity E for the case where the read is made fluctuating from the track center B of the track $T_n$ can be described by E=Cr/2+$\Delta S$. If an offset quantity which enables the read even if the offset quantity OSQ and the error quantity E overlap is denoted by $\alpha$, the following formula (1) stands, and the offset quantity $\Delta X$ can be obtained from the formula (1) as shown in the formula (2).

$$(\Delta X + \Delta S) + (Cr/2 + \Delta S) - \alpha = DS + Cw/2 \quad (1)$$

$$\Delta X = DS + (Cw/2 - Cr/2) + \alpha - 2\Delta S \quad (2)$$

Accordingly, it may be seen that the TPI margin of each head 13 is greatly dependent upon the write core width Cw of the head 13 and the on-track accuracy $\Delta S$. In addition, since the effective write core width Cw of the write head 13a depends on the write spread quantity which changes depending on the applied write current and the temperature of the environment, the actual write core width Cw is dependent upon the write current.

The write core with Cw differs depending on each individual head 13. In addition, the on-track accuracy $\Delta S$ differs depending on the track-which is followed. Hence, in this embodiment, the offset quantity $\Delta X$ described by the formula (2) described above, that is, the TPI margin, is obtained, and the write current which makes the value of the TPI margin greater than or equal to a predetermined value is automatically measured. In this embodiment, the write condition is measured using the obtained TPI margin for each individual head 13 and for each zone of the disk 15 having the track which is to be followed. Of course, the write condition may be obtained by approximation instead of measuring the write current for all of the heads and for all of the tracks.

When the TPI margin is obtained from the formula (1) described above by measuring the effective write core width Cw, it is possible to obtain the on-track accuracy $\Delta S$. When the TPI margin becomes a maximum, that is, the limit value of the offset quantity $\Delta X$ becomes a maximum, the limit value of the on-track accuracy $\Delta S$ becomes a minimum, and the on-track accuracy margin becomes a maximum. Thus, the write condition is set so that one of the margins becomes a maximum.

The write current may be measured and updated at the test stage during the production process of the magnetic disk unit, when shipping and. forwarding the magnetic disk unit, at arbitrary timings, at predetermined time intervals, every time the environment of the magnetic disk unit changes, when an error is generated, when the number of times the error is generated exceeds a predetermined value, and the like.

The value of the write current which is automatically measured is mapped for each head 13 and for each zone of the disk 15, and stored in the memory part 4 in the form of a table. FIG.3 is a diagram showing an embodiment of the table of write current values stored in the memory part 4. FIG.3 shows the case where the number of heads 13 is n, and the number of zones of the disk 15 is m. For example, the write current for the head 13 having the head number "2" and the zone having the zone number "3" is "I32" as shown in FIG.3.

The contents of the table shown in FIG.3 may be updated by making a calibration with respect to an adjusting cylinder at timings such as timings determined by the temperature when measuring the temperature and timings corresponding to predetermined time intervals.

A cylinder in an unused data region, a cylinder provided specially for the adjustment, cylinders in data regions located at the innermost peripheral side and the outermost peripheral side of the disk 15, and the like may be used as the adjusting cylinder described above.

In addition, by providing tables such as that shown in FIG.3 for a plurality of temperatures such as 0° C., 25° C. and 50° C. in correspondence with the measured results, it is possible to set the write current to an optimum value and carry out the write operation depending on the environmental temperature inside or outside the disk unit upon receipt of a write command. With respect to small temperature changes between 0° C. and 25° C. and between 25° C. and 50° C., for example, it is possible to calculate the write current using the tables provided with respect to the 3 temperatures 0° C., 25° C. and 50° C. and to set the calculated value as the optimum value when setting the write current at the time of the write operation.

Because the calibration takes time and the response performance from the host unit is deteriorated thereby, there are cases where the calibration cannot be made unless the power is turned ON or when an error is generated, depending on the environment in which the user uses the disk unit.

Figure 4:
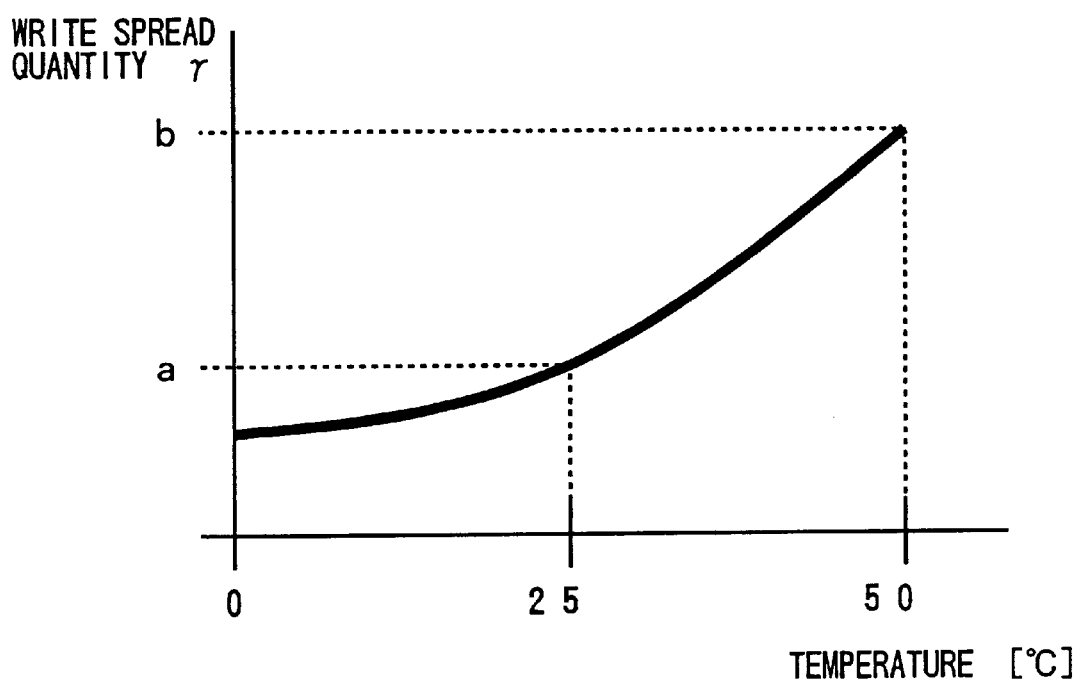
FIG.4 is a diagram showing a temperature correction characteristic.

In such cases where the calibration cannot be made, a temperature correction characteristic shown in FIG.4 is used. This temperature correction characteristic indicates a write spread quantity with respect to the temperature, and is prestored in the memory part 4 at the time of the forwarding the disk unit. In FIG.4, the ordinate indicates the write spread quantity $\gamma$ ($\mu$m), and the abscissa indicates the temperature (° C.).

Accordingly, the write spread quantity can be obtained from FIG.4 at predetermined timings determined by a predetermined temperature when measuring the temperature, timings of predetermined time intervals corresponding to a general temperature change or, upon receipt of the write command, by measuring the temperature and the elapsed time. The temperature correction can be made with respect to the TPI margin using the write spread quantity obtained from FIG.4.

More particularly, in a case where the write current is adjusted at 25° C., for example, even when a high temperature of 50° C. is supposed and the write spread quantity $\gamma$ is added to the write core width Cw, the write current is set so that a sufficient TPI margin is secured at this high temperature. In other words, the write current which makes a value $\Delta X-(b-a)$ greater than or equal to a predetermined value is set in the table of the write current value shown in FIG.3 described above which is provided for each temperature, for each head and for each zone.

The temperature correction described above using the temperature correction characteristic shown in FIG.4 may of course be carried out when the calibration is made.

Next, a description will be given of an off-track slice setting method. The off-track slice indicates a limit value of a positional error quantity of the head 13 with respect to a track which is to be scanned by the head 13. As described above, the offset quantity OSQ for the case where the write with respect to the track Tn is made with an offset from the track center A of the adjacent track $T_{n-1}$ can be described by $OSQ=\Delta X+\Delta S$. If an off-track slice OTSL is set with respect to this offset quantity OSQ so as to satisfy a relation $OTSL \leq \Delta X+\Delta S$, it is possible to detect a portion of the track $T_n$ which will be overwritten by the adjacent track $T_{n-1}$ exceeding a tolerable range as the track $T_n$ is overwritten by the adjacent track $T_{n-1}$, before such an excessive overwriting occurs. For example, an alarm may be generated when such a detection is made before the excessive overwriting of the track $T_n$ by the adjacent track $T_{n-1}$ actually occurs, so as to prevent such an excessive overwriting.

The off-track slice OTSL may be set to satisfy the following formula (3).

$$OTSL \leq \Delta X+\Delta S=\{DS+(Cw/2-Cr/2)+\alpha-2\Delta S\}+\Delta S=DS+(Cw/2-Cr/2)+\alpha-\Delta S \quad (3)$$

As may be seen from the formula (3) described above, the off-track slice OTSL is dependent upon the TPI margin, that is, the write current after the adjustment, the write code width Cw and the on-track accuracy. Accordingly, similarly as in the case of the write current, the off-track slice OTSL may also be automatically adjusted by measuring the TPI margin. In addition, the off-track slice OTSL may be set for each individual head 13 and for each zone of the disk 15 having the track which is to be followed.

The off-track slice OTSL may be measured and updated at the test stage during the production process of the magnetic disk unit, when shipping and forwarding the magnetic disk unit, at arbitrary timings, at predetermined time intervals, every time the environment of the magnetic disk unit changes, when an error is generated, when the number of times the error is generated exceeds a predetermined value, and the like.

The value of the off-track slice OTSL which is automatically measured is mapped for each head 13 and for each zone of the disk 15, and stored in the memory part 4 in the form of a table. FIG.5 is a diagram showing an embodiment of the table of off-track slice values stored in the memory part 4. FIG.5 shows the case where the number of heads 13 is n, and the number of zones of the disk 15 is m. For example, the off-track slice OTSL for the head 13 having the head number "2" and the zone having the zone number "3" is "O32" as shown in FIG.5.

The contents of the table shown in FIG.5 may be updated by making a calibration with respect to an adjusting cylinder at timings such as timings determined by the temperature when measuring the temperature and timings corresponding to predetermined time intervals.

A cylinder in an unused data region, a cylinder provided specially for the adjustment, cylinders in data regions located at the innermost peripheral side and the outermost peripheral side of the disk 15, and the like may be used as the adjusting cylinder described above.

In addition, by providing tables such as it that shown in FIG.5 for a plurality of temperatures such as 0° C., 25° C. and 50° C. in correspondence with the measured results, it is possible to set the off-track slice OTSL to an optimum value and carry out the write operation depending on the environmental temperature inside or outside the disk unit upon receipt of a write command. With respect to small temperature changes between 0° C. and 25° C. and between 25° C. and 50° C., for example, it is possible to calculate the off-track slice OTSL using the tables provided with respect to the 3 temperatures 0° C., 25° C. and 50° C. and to set the calculated value as the optimum value when setting the off-track slice OTSL at the time of the write operation.

Because the calibration takes time and the response performance from the host unit is deteriorated thereby, there are cases where the calibration cannot be made unless the power is turned ON or when an error is generated, depending on the environment in which the user uses the disk unit.

In such cases where the calibration cannot be made, the temperature correction characteristic shown in FIG.4 is used. As described above, this temperature correction characteristic indicates the write spread quantity with respect to the temperature, and is prestored in the memory part 4 at the time of the forwarding the disk unit.

More particularly, in a case where the off-track slice OTSL is adjusted at 25° C., for example, the temperature is measured at predetermined time intervals so that the off-track slice OTSL may be obtained from a TPI margin $(\Delta X+\gamma)$ with respect to the temperature change from the relationship of the write spread quantity $\gamma$ with respect to the temperature change shown in FIG.4 by adding the write spread quantity $\gamma$ to the value $\Delta X$ of the TPI margin. Hence, it is possible to update the table shown in FIG.5 of the values of the off-track slice OTSL for each temperature, with respect to each head and each zone.

When correcting the TPI margin using the temperature correction characteristic shown in FIG.4, the value of the off-track slice OTSL is obtained and set by taking into consideration the amount of temperature correction so that the following relationship stands, where $\tau$ is obtained by measuring $\tau$ together with the TPI margin or, it is assumed that $\tau$ is already taken into account in the TPI margin and is neglected whereby $\tau$ is regarded as $\tau=0$.

$$OTSL \leq [\Delta X-(b-a)]+[\Delta S(\pm \tau)]$$

Figure 6:
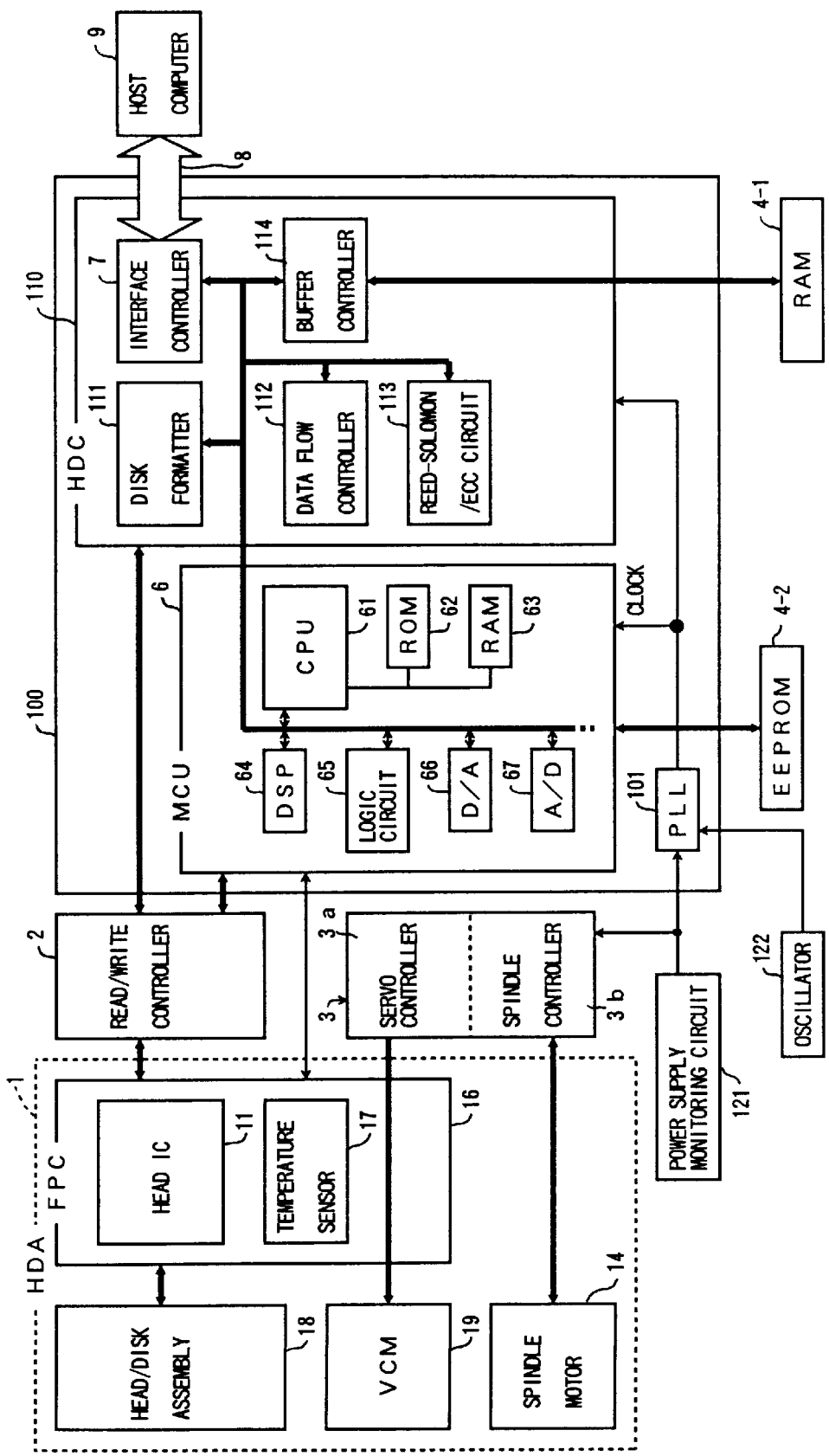
FIG.6 is a system block diagram showing the construction of the embodiment of the disk unit in more detail.

Next, a more detailed description will be given of the construction of this embodiment of the disk unit, by referring to FIG.6. FIG.6 is a system block diagram showing the construction of the embodiment of the disk unit shown in FIG.1 in more detail. In FIG.6, those parts which are the same as those corresponding parts in FIG.1 are designated by the same reference numerals, and a description thereof will be omitted.

As shown in FIG.6, the magnetic disk unit includes the HDA (or disk enclosure) 1, the read/write controller 2, the control unit 3, a unit 100, a RAM 4-1, a flash electrically erasable programmable read only memory (EEPROM) 4-2, a power supply monitoring circuit 121, and an oscillator 122. The RAM 4-1 and the flash EEPROM 4-2 form the memory part 4.

The HDA 1 generally includes the spindle motor 14, a flexible printed circuit (FPC) 16, a head/disk assembly 18, and a voice coil motor (VCM) 19. The head IC 11 and a temperature sensor 17 are provided on the FPC 16. The head/disk assembly 18 includes the actuator 12, the heads 13 and the disks 15, and the actuator 12 is driven by the VCM 19. The construction of the HDA 1 itself is basically the same as that of a HDA of a known magnetic disk unit, excluding the provision of the temperature sensor 17 on the FPC 16.

The MCU 6 generally includes a central processing unit (CPU) 61, a ROM 62, a RAM 63, a digital signal processor (DSP) 64, a logic circuit 65, a digital-to-analog (D/A) converter 66, and an analog-to-digital (A/D) converter 67. The CPU 61 controls various parts of the magnetic disk unit based on programs stored in the ROM 62. The RAM 63 stores data which are used when the CPU 61 executes the programs and intermediate data which are generated during calculation processes carried out by the CPU 61. The DSP 64 and the logic circuit 65 are provided to carry out data processings at a processing speed higher than that of the programs executed by the CPU 61. The D/A converter 66 converts the data to be written on the disk 15 within the HDA 1 into analog signals, and the A/D converter 67 converts the data read from the disk 15 within the HDA 1 into digital signals. The A/D converter 67 also receives an output signal of the temperature sensor 17 within the HDA 1. In addition, the write current applied to the head 13 is output from the D/A converter 66. The flash EEPROM 4-2 is provided as an auxiliary memory for the MCU 6.

A hard disk controller (HDC) 110 generally includes the interface controller.17, a disk formatter 111, a data flow controller 112, a Reed-Solomon/error correction code (ECC) circuit 113, and a buffer controller 114. The disk formatter 111 carries out a formatting of information to be written on the disk 15 within the HDA 1. The data flow controller 112 controls the data flow between the magnetic disk unit and the host computer 9. The Reed-Solomon/ECC circuit 113 carries out the process of encoding the data to be written on the disk 15 and adding the ECC, and the process of decoding the data read from the disk 15 and carrying out an error correction using the ECC. The buffer controller 114 controls the writing of data to and the reading of data from the RAM 4-1. The disk formatter 111, the data flow controller 112, the Reed-Solomon/ECC circuit 113 and the buffer controller 114 form the sequence controller 5.

The power supply monitoring circuit 121 monitors the power supply voltage supplied to the control unit 3 and the unit 100, and carries out a control so that a power supply voltage within a tolerable range is supplied to various parts of the magnetic disk unit. The oscillator 122 inputs a reference clock to a phase locked loop (PLL) circuit 101 within the unit 100, and the PLL circuit 101 supplies a clock which is generated based on the reference clock to the MCU 6 and various parts within the HDC 110. The MCU 6, the PLL circuit 101 and the HDC 110 form the unit 100.

A known construction may be used as the part of the magnetic disk unit comprising the read/write controller 2, the control unit 3, the unit 100, the RAM 4-1, the flash EEPROM 4-2, the power supply voltage monitoring circuit 121 and the oscillator 122. This embodiment is characterized by the processes carried out by the MCU 6.

Figure 7:
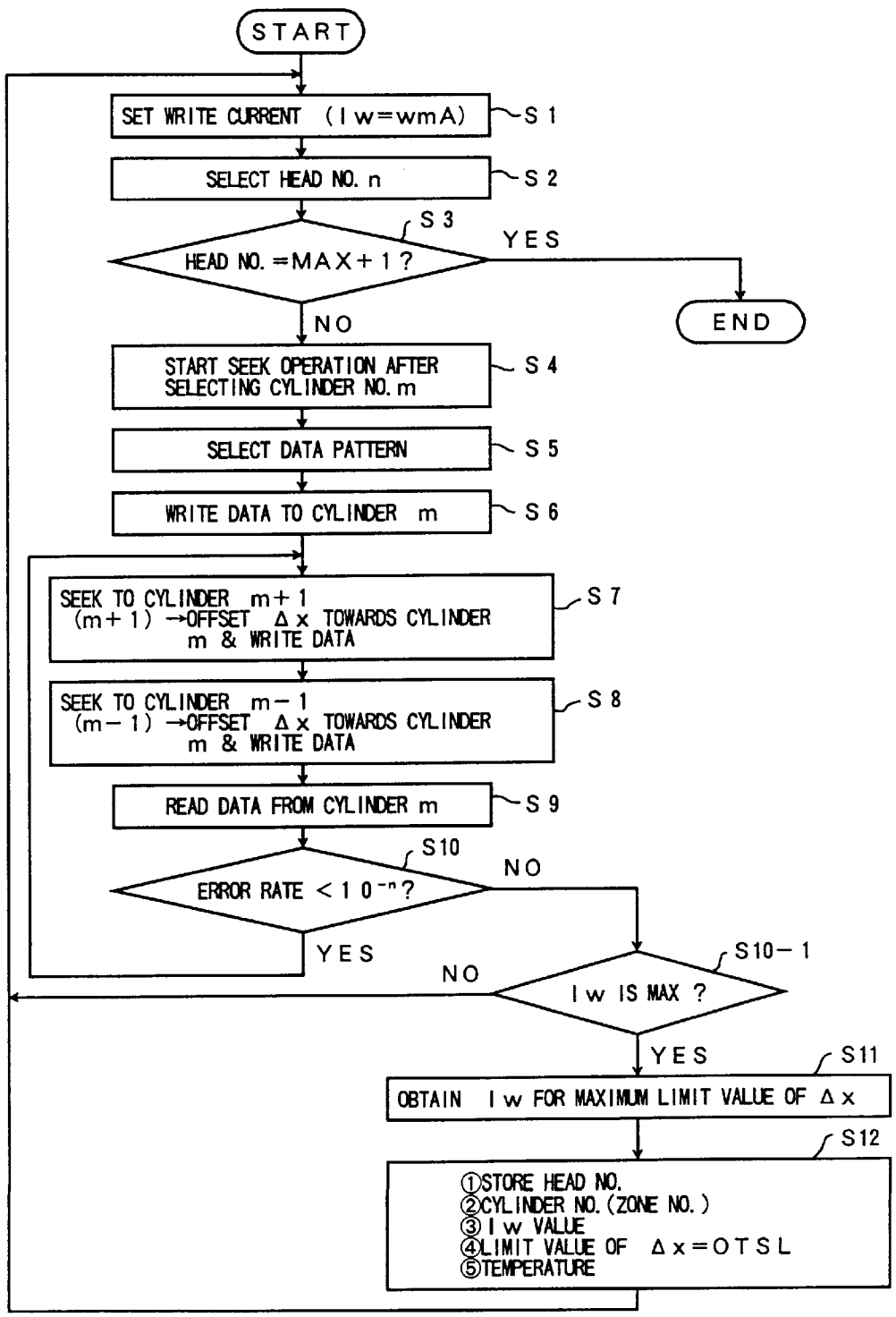
FIG.7 is a flow chart for explaining a TPI margin measuring process.

FIG.7 is a flow chart for explaining a TPI margin measuring process. The TPI margin measuring process shown in FIG.7 is carried out by the CPU 61 within the MCU 6 or, the CPU 61 and the DSP 64 and/or the logic circuit 65.

In FIG.7, a step Si sets a write current Iw. This write current Iw is set to Iw=w mA in steps of 2 mA if w=20 mA to 50 mA, for example. A step selects a head number n. In this case, the head number is selected in an order of "0" to "n". A step S3 decides whether or not the head number is equal to a maximum number MAX plus one (that is, MAX+1), and the process ends if the head number is MAX+1=n+1 and the decision result is YES.

On the other hand, if the decision result in the step S3 is NO, a step S4 selects a cylinder number m and starts a seek operation. The cylinder number m is selected to an innermost cylinder of an outer zone of each disk 15, for example. If the outer side of the disk 15 has the minimum cylinder number, the cylinder number m may be selected to "maximum cylinder number plus two (m+2)" on the inner side of the data region and not belonging to the data region or, "minimum cylinder number minus two (m−2)" on the outer side of the data region and not belonging to the data region. Next, a step S5 selects a data pattern. For example, the data pattern is selected to a repetition of "$00_H$" with respect to the cylinder number m, a repetition of "$FF_H$" with respect to the cylinder number m+1, and a repetition of "$FF_H$" with respect to the cylinder number m−1. A step S6 writes the data to the cylinder number m. Hence, different data patterns are written between the cylinder number m which is to be measured and the cylinder numbers m−1 and m+1 on both sides of the cylinder number m. For this reason, it is possible to prevent an erroneous recognition by comparing the data pattern read from the cylinder number m with the data patterns read from the cylinder numbers m−1 and m+1.

A step S7 makes a seek operation with respect to the cylinder number m+1, and writes the data by offsetting the head 13 by $\Delta X$ μm towards the cylinder number m. In addition, the step S8 makes a seek operation with respect to the cylinder number m−1, and writes the data by offsetting the head 13 by $\Delta X$ μm towards the cylinder number m. A step S9 reads the data from the cylinder number m, and a step S10 decides whether or not an error rate of the read data is less than $10_{-n}$. The process returns to the step S7 if the decision result in the step S10 is YES.

On the other hand, if the decision result in the step S10 is NO, a step S10-1 decides whether or not the write current Iw is a maximum. In other words, since the write current Iw is set in steps of 2 mA in the range of 20 mA to 50 mA in this case, the step S10-1 detects the write current Iw which makes $\Delta X$ a maximum value within the range of 20 mA to 50 mA. If the decision result in the step S10-1 is NO, the process returns to the step S1 and the write current Iw is changed by a step of 2 mA. Therefore, the measurement is made in the range of Iw=20 mA to 50 mA, and the write current Iw which makes the limit value of $\Delta X$ the maximum is found. On the other hand, if the decision result in the step S10-1 is YES, a limit value which makes the error rate greater than or equal to $10_{-n}$ by offsetting the head 13 by $\Delta X$ μm is obtained. More particularly, a step S11 obtains a value of the write current Iw which makes the limit value (off-track slice) OTSL of the offset quantity (TPI margin) of $\Delta X$ μm a maximum. In addition, a step S12 stores the head number, the cylinder number, the value of the write current Iw, the value of the off-track slice OTSL and the temperature for this case into the RAM 63 or the flash EEPROM 4-2. After the step S12, the process returns to the step S1.

In this embodiment, the above described steps S4 through S12 are carried out for each zone of the disk 15. Hence, in this case, the step S12 stores the zone number in the RAM 63 or the flash EEPROM 4-2 in addition to the cylinder number. Therefore, the table of the write current values shown in FIG.3 and the table of the off-track slice values shown in FIG.5 are formed and stored in the RAM 63 or the flash EEPROM 4-2. The above described steps are repeated for a plurality of temperatures, and the tables are formed for each of the plurality of temperatures.

As described above, the TPI margin measuring process shown in FIG.7 may be carried out at arbitrary timings.

Figure 8:
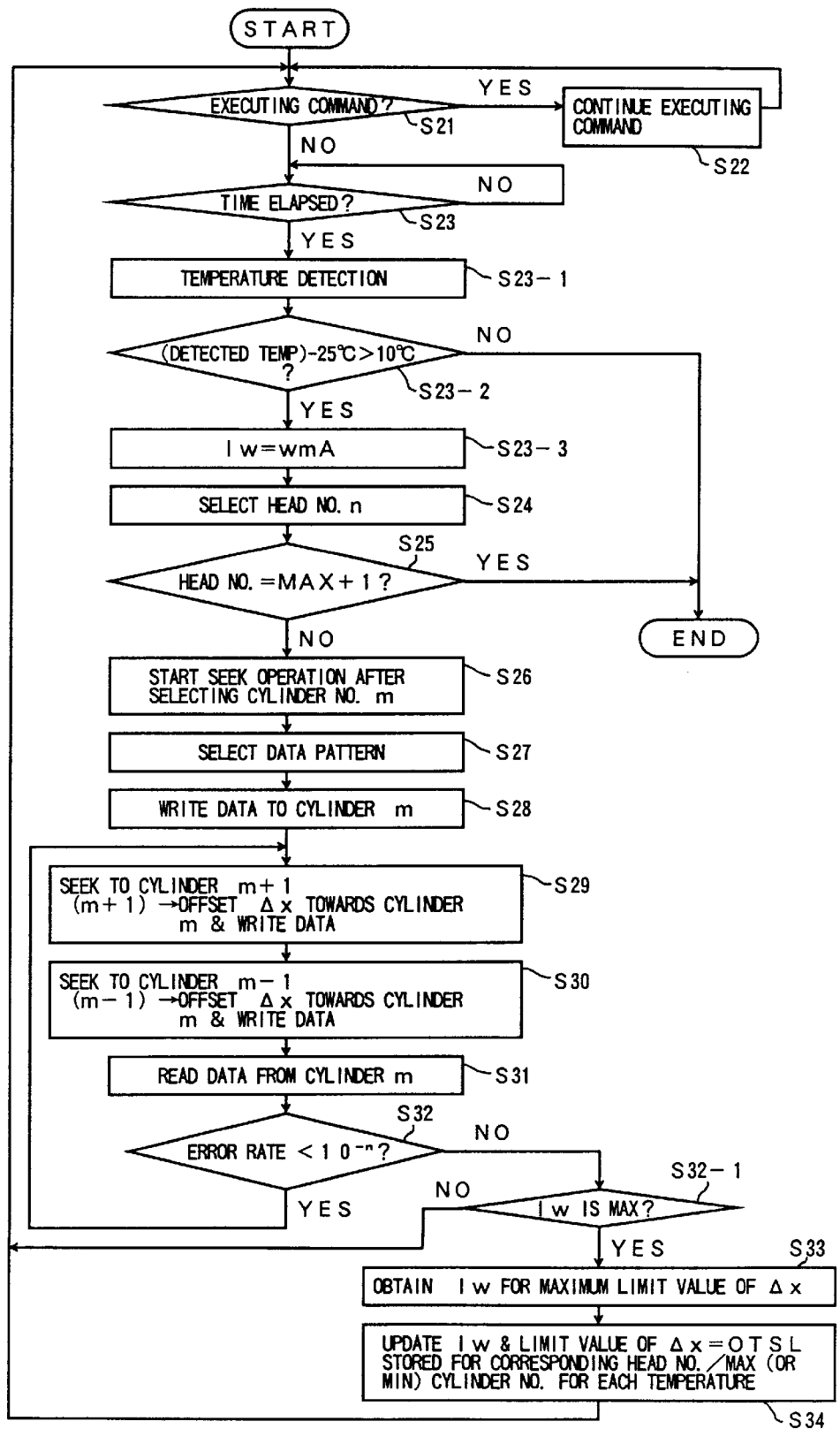
FIG.8 is a flow chart for explaining a calibration process.

FIG.8 is a flow chart for explaining a calibration process after forwarding the disk unit. The calibration process shown in FIG.8 is carried out by the CPU 61 within the MCU 6 or, the CPU.61, the DSP 64 and/or the logic circuit 65.

In FIG.8, a step S21 decides whether or not a command is being executed. If the decision result in the step S21 is YES, a step S22 continues the command process, and the process returns to the step S21. On the other hand, if the decision result in the step S21 is NO, a step S23 decides whether or not a predetermined time timed by a calibration timer has elapsed. If the decision result in the step S23 becomes YES, a step S23-1 reads the output of the temperature sensor 17 to detect the present temperature. A step S23-2 decides whether or not a temperature obtained by subtracting 25° C. from the detected present temperature is greater than 10° C., for example. The process ends if the decision result in the step S23-2 is NO. On the other hand, if the decision result in the step S23-2 is YES, a step S23-3 sets the write current Iw in steps of 2 mA to Iw=w mA within the range of w=20 mA to 50 mA, for example, and a calibration including a step S24 and subsequent steps is then carried out. In this embodiment, the calibration is carried out for each head 13.

The step S24 selects a head number n. In this case, the head number is selected in an order from "0" to "n". A step S25 decides whether or not the head number is equal to a maximum number MAX plus one (that is, MAX+1), and the process ends if the head number is MAX+1=n+1 and the decision result is YES.

On the other hand, if the decision result in the step S25 is NO, a step S26 selects a cylinder number m and starts a seek operation. If the outer side of the disk 15 has the minimum cylinder number, the cylinder number m is selected to "maximum cylinder number plus two (m+2)" on the inner side of the data region and not belonging to the data region or, "minimum cylinder number minus two (m−2)" on the outer side of the data region and not belonging to the data region. Next, a step S27 selects a data pattern. For example, the data pattern is selected to a repetition of "$00_H$" with respect to the cylinder number m, a repetition of "$FF_H$" with respect to the cylinder number m+1, and a repetition of "$FF_H$" with respect to the cylinder number m−1. A step S28 writes the data to the cylinder number m. Hence, different data patterns are written between the cylinder number m which is to be measured and the cylinder numbers m−1 and m+1 on both sides of the cylinder number m. For this reason, it is possible to prevent an erroneous recognition by comparing the data pattern read from the cylinder number m with the data patterns read from the cylinder numbers m−1 and m+1.

A step S29 makes a seek operation with respect to the cylinder number m+1, and writes the data by offsetting the head 13 by ΔX μm towards the cylinder number m. In addition, the step S30 makes a seek operation with respect to the cylinder number m−1, and writes the data by offsetting the head 13 by ΔX μm towards the cylinder number m. A step S31 reads the data from the cylinder number m, and a step S32 decides whether or not an error rate of the read data is less than $10^{-n}$. The process returns to the step S29 if the decision result in the step S32 is YES.

On the other hand, if the decision result in the step S32 is NO, a step S32-1 decides whether or not the write current Iw is a maximum. In other words, since the write current Iw is set in steps of 2 mA in the range of 20 mA to 50 mA in this case, the step S32-1 detects the write current Iw which makes ΔX a maximum value within the range of 20 mA to 50 mA. If the decision result in the step S32-1 is NO, the process returns to the step S21 and the write current Iw is changed by a step of 2 mA. Therefore, the measurement is made within the range of Iw=20 mA to 50 mA, and the write current Iw which makes the limit value of ΔX the maximum is found. On the other hand, if the decision result in the step S32-1 is YES, a limit value which makes the error rate greater than or equal to $10^{-n}$ by offsetting the head 13 by ΔX μm is obtained. More particularly, a step S33 obtains the write current Iw which makes the limit value (off-track slice) OTSL of the offset quantity (TPI margin) ΔX pm a maximum. In addition, a step S34 updates the values of th e write current Iw and the off-track slice OTSL stored in the RAM 63 or the flash EEPROM 4-2 with respect to the head number and the maximum or minimum cylinder number for each temperature. In other words, the values of the write current Iw and the off-track slice OTSL are updated with respect to the table which is provided for each of the temperatures. In this embodiment, the updating of the values is made for every 10° C., such as 25° C., 35° C., 45° C. and 55° C., for example, and whether the initial temperature is set to 0° C. or 25° C., for example, depends on the environment in which the user uses the disk unit. For the sake of convenience, it is assumed in this case that the initial temperature is set to 25° C. (normal temperature). After the step S34, the process returns to the step S21.

Figure 9:
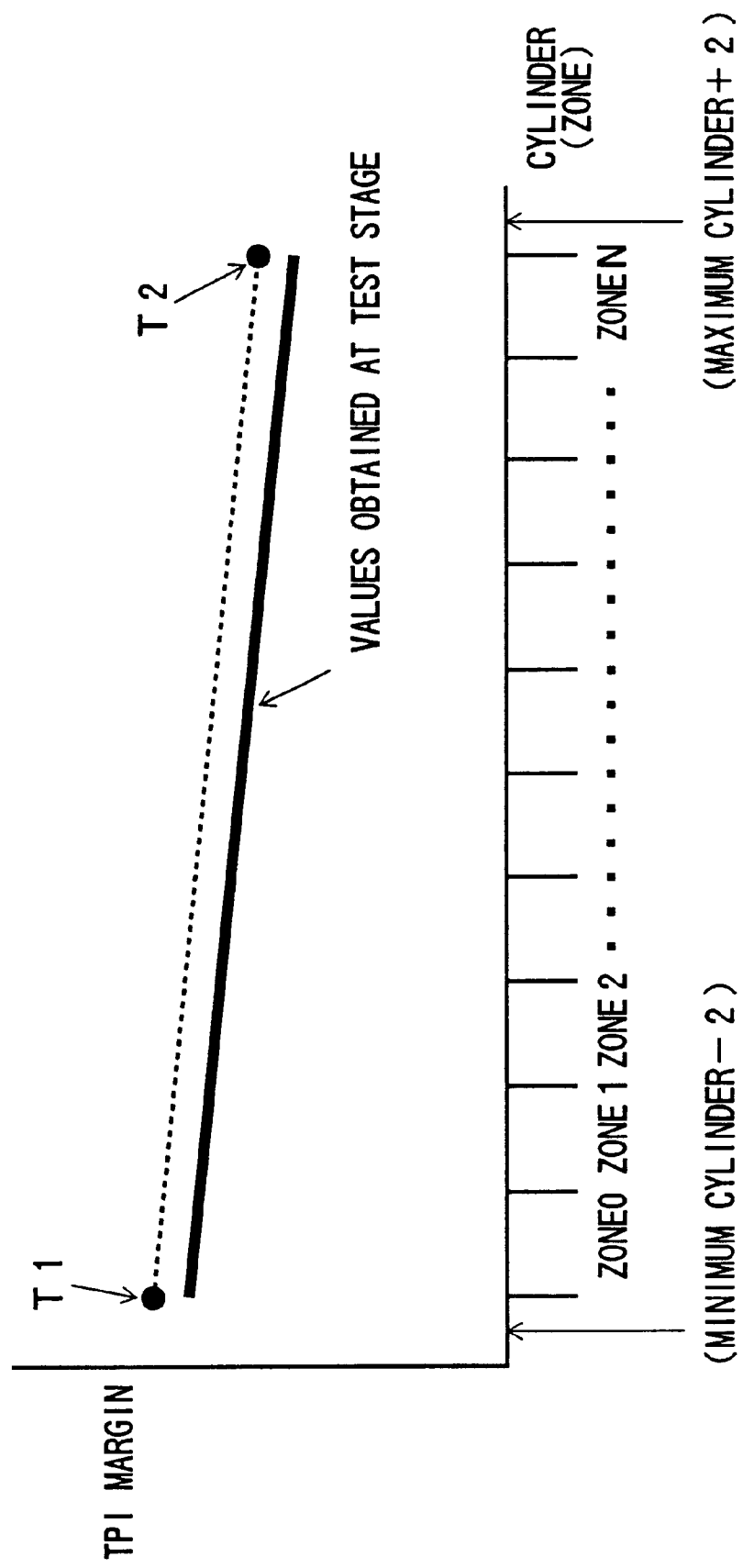
FIG.9 is a diagram showing the TPI margin value obtained at a test stage at the time of shipping and the TPI margin value obtained by the calibration.

In this case, the calibration is carried out with respect to each head 13 at only two locations, that is, the maximum cylinder number plus two and the minimum cylinder number minus two. Hence, the values of the TPI margin in each of the zones can be interpolated by a linear interpolation shown in FIG.9. FIG.9 shows the values of the TPI margin obtained in advance at the test stage when shipping and forwarding the magnetic disk unit, and the values of the TPI margin obtained by the calibration. In FIG.9, the ordinate indicates the value of the TPI margin, and the abscissa indicates the zone. In addition, a solid line indicates the values of the TPI margin obtained at the test stage when shipping and forwarding the magnetic disk unit, and T1 and T2 indicate the values of the TPI margin which are obtained by the calibration.

The most recent values of the TPI margin can be obtained by carrying out the linear interpolation indicated by a dotted line in FIG.9 between the values T1 and T2 which are obtained by the calibration, with respect to the values of the TPI values obtained at the test stage when shipping and forwarding the magnetic disk unit. Hence, the values of the off-track slice OTSL can be obtained based on the most recent values of the TPI margin obtained by the above described linear interpolation. Hence, by storing the most recent values of the off-track slice OTSL in the table of off-track slice values shown in FIG.5, it is possible to update the table of the off-track slice values.

In the step S12 shown in FIG.7 and the step S34 shown in FIG.9, it is possible to generate an alarm if the value of the off-track slice exceeds a predetermined value. In this case, the generated alarm is notified to the host computer 9 from the CPU 61, for example.

Figure 10:
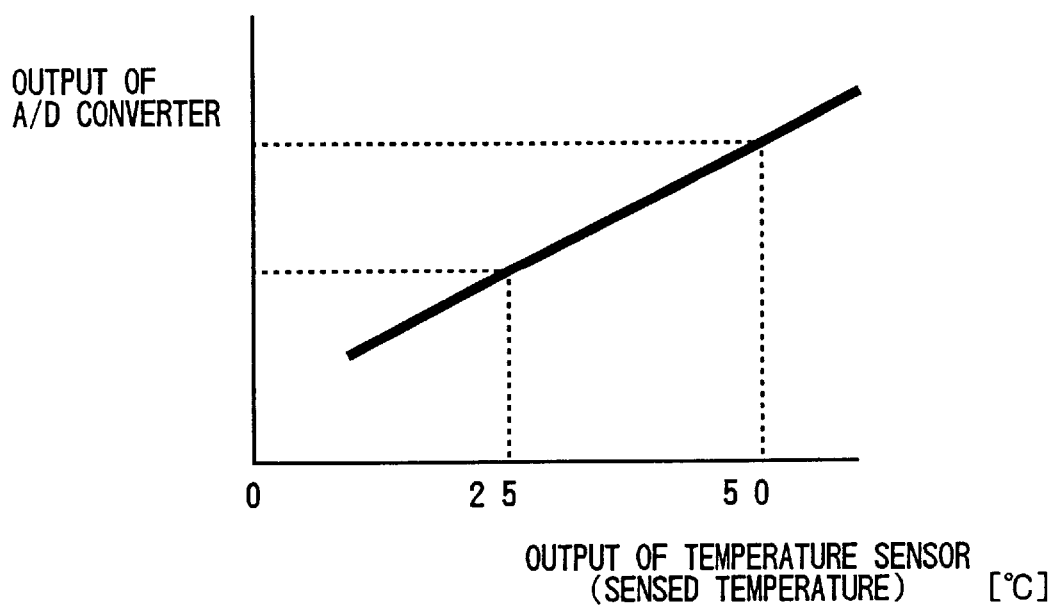
FIG.10 is a diagram showing the relationship of the output of a temperature sensor and an output of an analog-to-digital converter.

FIG.10 is a diagram showing the relationship of the output of the temperature sensor 17 and the output of the A/D converter 67. In FIG.10, the ordinate indicates the output of the A/D converter 67 in arbitrary units, and the abscissa indicates the output of the temperature sensor 17 in ° C.

When the calibration shown in FIG.8 is not made, it is possible to obtain the write spread quantity γ shown in FIG.4 based on output temperature information of the temperature sensor 17 shown in FIG.10. For example, if the adjustment is made at 25° C. at the time of shipping and forwarding the magnetic disk unit, the write spread quantity γ with respect to a temperature change can be obtained by monitoring the output of the temperature sensor 17 by the CPU 61 at predetermined time intervals. By adding this write spread quantity γ to the TPI margin ΔX, it is possible to obtain the TPI margin ΔX+γ with respect to the temperature change. The value of the off-track slice OTSL can be obtained from the TPI margin ΔX+γ with respect to the temperature change, and the table of the off-track slice values shown in FIG.5 may be updated based on such values of the off-track slice OTSL. In this case, the TPI margin measuring process may be basically the same as that shown in FIG.7 except that in this case, the step S12 shown in FIG.7 obtains the value of the off-track slice OTSL from the TPI margin ΔX+γ with respect to the temperature change.

Instead of obtaining the value of the TPI margin, it is possible to measure the value of the offset margin or the on-track accuracy margin with respect to each head. The offset margin in this case indicates a limit of the offset that enables the data written in a predetermined cylinder from being read even if the head which is positioned with respect to the predetermined cylinder generates an offset.

In other words, in FIG.7 or 8, it is possible to measure the offset margin or the on-track accuracy margin instead of measuring the value of the. TPI margin. In this case, instead of obtaining the value of the TPI margin by taking into consideration the parameters which are dependent upon the temperature, the write current applied to the head is variably set so that the offset margin or the on-track accuracy margin becomes a maximum. In addition, the parameters which are dependent upon the temperature may be at least one parameter selected from a group of parameters including the positioning accuracy error, the run out and the write spread.

Figure 11:
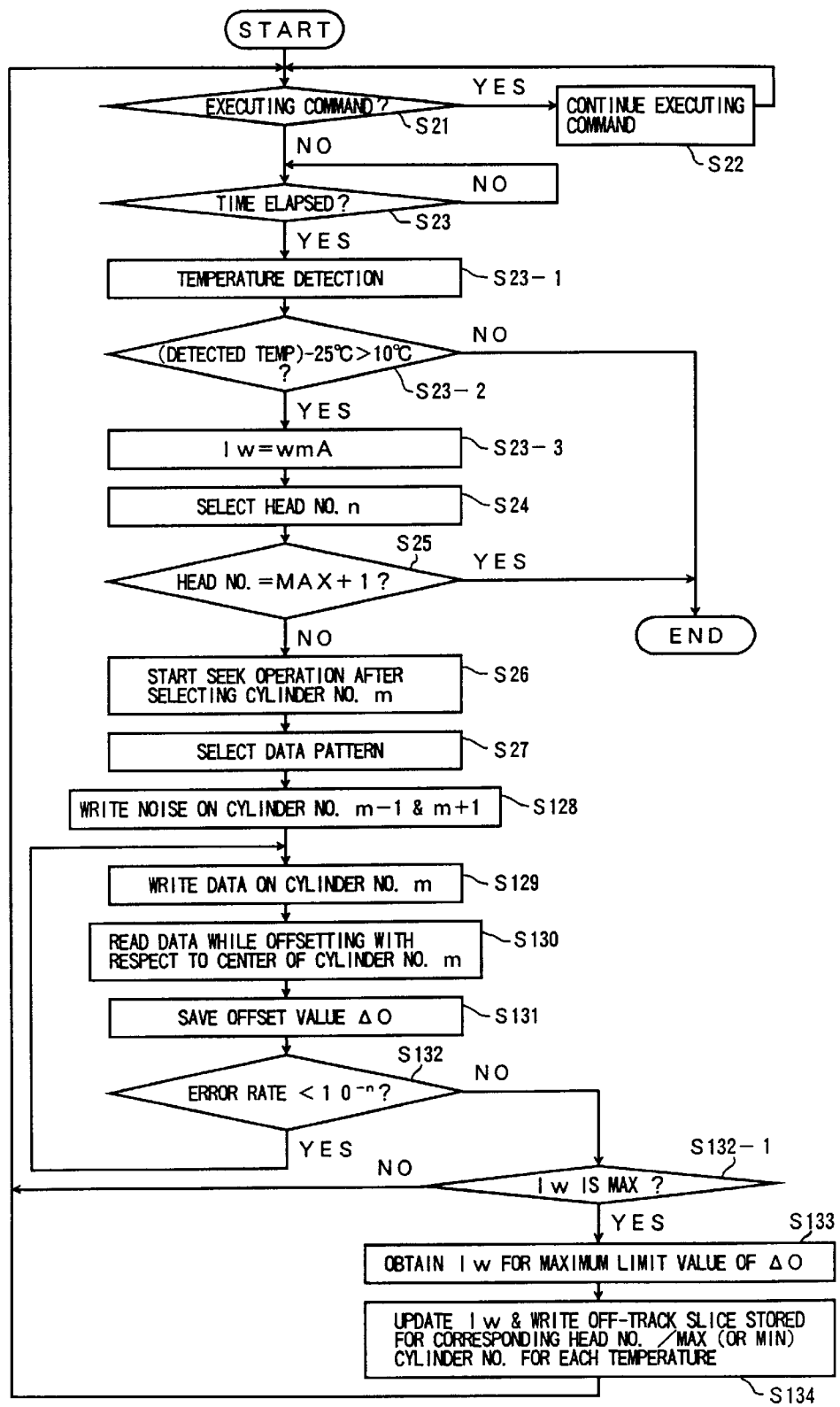
FIG.11 is a flow chart for explaining another calibration process.

FIG.11 is a flow chart for explaining another calibration process. The calibration process shown in FIG.11 is carried out by the CPU 61 within the MCU 6 or, the CPU 61, the DSP 64 and/or the logic circuit 65. In FIG.11, those steps which are the same as those corresponding steps in FIG.8 are designated by the same reference numerals, and a description thereof will be omitted.

In FIG.11, after the step S27, a step S128 writes noise on the cylinders having the cylinder numbers m+1 and m−1 and are adjacent to respective sides of the cylinder having the cylinder number m. A step S129 writes data on the cylinder having the cylinder number m. A step S130 reads the data from the cylinder having the cylinder number m while offsetting the head towards the cylinder having the cylinder number m−1 (or m+1) with respect to a center of the cylinder having the cylinder number m. A step S131 saves an offset value ΔO, and a step S132 decides whether or not the error rate of the read data is less than $10^{-n}$. The process returns to the step S21 if the decision result in the step S132 is YES.

On the other hand, if the decision result in the step S132 is NO, a step S132-1 decides whether or not the write current Iw is a maximum. In other words, since the write current Iw is set in steps of 2 mA in the range of 20 mA to 50 mA in this case, the step S132-1 detects the write current Iw which makes the offset margin (ΔO) a maximum value within the range of 20 mA to 50 mA. If the decision result in the step S132-1 is NO, the process returns to the step S21 and the write current Iw is changed by a step of 2 mA. Therefore, the measurement is made within the range of Iw=20 mA to 50 mA, and the write current IW which makes the limit value of the offset margin (ΔO) the maximum is found. On the other hand, if the decision result in the step S132-1 is YES, a limit value which makes the error rate greater than or equal to $10^{-n}$ with respect to the saved offset value ΔO is obtained. More particularly, a step S133 obtains the write current Iw which makes the limit value of the offset margin (ΔO) the maximum. In addition, a step S134 updates the values of the write current Iw and the write off-track slice OTSL stored in the RAM 63 or the flash EEPROM 4-2 with respect to the head number and the maximum or minimum cylinder number for each temperature. In other words, the values of the write current Iw and the write off-track slice OTSL are updated with respect to the table which is provided for each of the temperatures. After the step S134, the process returns to the step S21.

When measuring the offset margin, the offset value (quantity) ΔO which becomes the offset margin corresponds to the full width that can be read by offsetting the head with respect to a certain track after writing noise on tracks formed on both sides of the certain track. This offset value ΔO can be described by the following formula, where β is an offset quantity which makes the reading possible even if Cr and ΔS overlap.

$$\Delta O = 2 \cdot [(Cw/2 - Cr/2) - \Delta S + \beta]$$
$$= (Cw - Cr) - 2\Delta S + 2\beta$$
$$= 2DS + Cw$$

Since ΔX=DS+(Cw/2−Cr/2)+α−2ΔS, 2ΔS=DS+(Cw/2−Cr/2)+α−ΔX can be obtained therefrom. Accordingly, the offset value ΔO can be described by the following formula.

$$\Delta O = (Cw - Cr) - [DS + (Cw/3 - Cr/2) + \alpha - \Delta X] + 2\beta$$
$$= (Cw - Cr)/2 - DS - \alpha + 2\beta + \Delta X$$

Therefore, since the TPI margin can be obtained from the offset margin, it is possible to obtain the off-track slice similarly to the case of the TPI margin.

In addition, when writing the data on the track of the disk 15, it is possible to measure the TPI margin, the offset margin and the on-track accuracy margin with respect to each head 13, and to variably set the write current so that two or more of these margins become a maximum.

When the write current is set for each head and for each zone, and a head having a wide write core width, that is, a head having a large write spread, for example, is used, the data on the adjacent tracks may be erased and an unrecoverable error may be generated if the error in the positioning accuracy of the track and the run out are large. However, the error in the positioning accuracy of the track and the run out which are affected by the temperature change, and the write spread quantity which is determined by the write core width, become inconsistent depending on the individual head and the position. Hence, by measuring the margin such as the TPI margin and setting the write current and the off-track slice as in the present invention so as not to erase the data on the adjacent track, it becomes possible to positively prevent the generation of the unrecoverable error.

In each of the embodiments described above, a process is carried out depending on the temperature in the case where the calibration cannot be made, but it is of course possible to carry out the process when the power is turned ON, when the error is detected and the like.

Further, the present invention is not limited to these embodiments, but various variations and modifications may be made without departing from the scope of the present invention.

What is claimed is:

1. A write condition setting method comprising the steps of:

(a) measuring at least one of a track per inch margin, an offset margin and an on-track accuracy margin with respect to a head for each of a plurality of temperatures prior to writing data on a track of a disk; and (b) variably setting at least one of a write current applied to the head and an off-track slice as a write condition for each of the plurality of temperatures based on a parameter which is dependent upon temperature so that said at least one of the track per inch margin, the offset margin and the on-track accuracy margin becomes a maximum.

2. The write condition setting method as claimed in claim 1, which further comprises the steps of:

(c) generating an alarm when a limit value of a positional error quantity of the head with respect to a track to be scanned exceeds a predetermined value.

3. The write condition setting method as claimed in claim 2, wherein said step (c) obtains the limit value from said at least one of the track per inch margin, the offset margin and the on-track accuracy margin.

4. The write condition setting method as claimed in claim 2, which further comprises the steps of:

(d) updating the limit value based on said at least one of the track per inch margin, the offset margin and the on-track accuracy margin.

5. The write condition setting method as claimed in claim 1, wherein said steps (a) and (b) are carried out at arbitrary timings.

6. The write condition setting method as claimed in claim 1, wherein said step (b) stores and updates at least one of the write current and the off-track slice which are variably set.

7. The write condition setting method as claimed in claim 1, wherein said steps (a) and (b) are carried out independently with respect to each of a plurality of heads.

8. The write condition setting method as claimed in claim 1, wherein said steps (a) and (b) are carried out independently with respect to each zone of a plurality of disks.

9. The write condition setting method as claimed in claim 1, wherein said step (b) variably sets at least one of the write current and the off-track slice so that two or more of the track per inch margin, the offset margin and the on-track accuracy margin become a maximum.

10. The write condition setting method as claimed in claim 1, wherein the parameter which is dependent upon the temperature is selected from a group of parameters consisting of a positioning accuracy error, a run out, and a track spread.

11. A disk unit for storing/retrieving data to/from a disk comprising:

a head writing data to and reading data from a track of the disk;

measuring means for measuring at least one of a track per inch margin, an offset margin and an on-track accuracy margin with respect to the head for each of a plurality of temperatures prior to writing data on a track of the disk by said head; and setting means for variably setting at least one of a write current applied to the head and an off-track slice as a write condition for each of the plurality of temperatures based on a parameter which is dependent upon temperature so that said at least one of the track per inch margin, the offset margin and the on-track accuracy margin becomes a maximum.

12. The disk unit as claimed in claim 11, which further comprises:

alarm generating means for generating an alarm when a limit value of a positional error quantity of the head with respect to a track to be scanned exceeds a predetermined value.

13. The disk unit as claimed in claim 12, wherein said alarm generating means obtains the limit value from said at least one of the track per inch margin, the offset margin and the on-track accuracy margin.

14. The disk unit as claimed in claim 12, which further comprises:

updating means for updating the limit value based on said at least one of the track per inch margin, the offset margin and the on-track accuracy margin.

15. The disk unit as claimed in claim 11, wherein said measuring means and said setting means respectively measure the margin and variably set at least one of the write current and the off-track slice at arbitrary timings.

16. The disk unit as claimed in claim 11, which further comprises:

storage means;

said measuring means storing and updating at least one of the write current and the off-track slice which are variably set in said storage means.

17. The disk unit as claimed in claim 11, wherein a plurality of heads are provided, and said measuring means and said setting means respectively measure the margin and variably set at least one of the write current and the off-track slice independently with respect to each of the plurality of heads.

18. The disk unit as claimed in claim 11, wherein a plurality of disks are provided, and said measuring means and said setting means respectively measure the margin and variably set at least one of the write current and the off-track slice independently with respect to each zone of the plurality of disks.

19. The disk unit as claimed in claim 11, wherein said setting means variably sets at least one of the write current and the off-track slice so that two or more of the track per inch margin, the offset margin and the on-track accuracy margin become a maximum.

20. The disk unit as claimed in claim 11, wherein the parameter which is dependent upon the temperature is selected from a group of parameters consisting of a positioning accuracy error, a run out, and a track spread.

21. The disk unit as claimed in claim 11, which further comprises:

write means for writing data on the disk by reading at least one of the write current and the off-track slice set by said setting means when writing data.

* * * * *